United States Patent [19]

Ikenoya et al.

[11] 4,437,306
[45] Mar. 20, 1984

[54] EXHAUST GAS CLEANING DEVICE OF INTERNAL COMBUSTION ENGINE

[75] Inventors: Yasuo Ikenoya, Kawagoe; Kanau Iwashita, Sakato; Hikaru Kimura, Koganei, all of Japan

[73] Assignee: Honda Giken Kogyo Kabushiki Kaisha, Tokyo, Japan

[21] Appl. No.: 428,793

[22] Filed: Sep. 30, 1982

[30] Foreign Application Priority Data

Nov. 25, 1981 [JP] Japan ............................... 56-188555
Dec. 9, 1981 [JP] Japan ............................... 56-197888

[51] Int. Cl.³ .............................................. F01N 3/30
[52] U.S. Cl. .................................. 60/293; 60/304; 180/319
[58] Field of Search ....................... 60/293, 304, 305; 180/219

[56] References Cited

U.S. PATENT DOCUMENTS 4,133,175  1/1979  Katoh ................................... 60/305
4,154,058  5/1979  Mase .................................... 60/313
4,387,565  6/1983  Otani .

FOREIGN PATENT DOCUMENTS

161911  12/1980  Japan ................................... 60/293

*Primary Examiner*—Douglas Hart
*Attorney, Agent, or Firm*—Armstrong, Nikaido, Marmelstein & Kubovcik

[57] ABSTRACT

An exhaust gas cleaning device of an internal combustion engine wherein a secondary-air supply passage is connected to an exhaust system of the engine and a reed valve means is provided in the intermediate part of the secondary-air supply passage for opening in response to the pulsation pressure of the exhaust gas in the exhaust system to supply secondary air for cleaning exhaust gas to an exhaust passage and burn the unburnt components present in the exhaust passage thereby to clean exhaust gas. A desired amount of secondary air is supplied to each of a plurality of exhaust systems so that the exhaust gas cleaning efficiency as well as the reliability and durability of the reed valve means are improved and moreover a good external appearance is obtained.

6 Claims, 10 Drawing Figures

EXHAUST GAS CLEANING DEVICE OF INTERNAL COMBUSTION ENGINE

BACKGROUND OF THE INVENTION

1. Field of the Invention

The present invention relates to an exhaust gas cleaning device of an internal combustion engine wherein a secondary-air supply passage is connected to an exhaust system of the internal combustion engine and a reed valve means is provided in the intermediate part of the secondary-air supply passage so as to be opened in response to the pulsation pressure of exhaust gas in the exhaust system in order to supply secondary air into the exhaust system and burn the unburnt components present in the exhaust system thereby to clean the exhaust gas.

2. Description of the Prior Art

Such an internal combustion engine has been already known as having a plurality of exhaust ports opened to the combustion chamber of a cylinder and exhaust pipes independent of each other communicated with these exhaust ports respectively, the exhaust pipes being made different in length from each other, thereby to improve the performance of the engine over the whole operation ranges thereof.

By the way, such an internal combustion engine has the following problem. In case of supplying secondary air for cleaning exhaust gas into the exhaust systems different in length, if the secondary-air supply passages communicated with the exhaust systems respectively are concentrated and connected to a single reed valve, which is adapted to be opened in response to the exhaust gas pulsation pressure produced in each of the exhaust systems so that secondary air is introduced into each of the exhaust systems, the exhaust gas pulsation pressures produced in the exhaust systems respectively may cancel out each other because the frequencies of the exhaust gas pulsations generated in these exhaust systems respectively differ from each other in accordance with the difference in length between the exhaust systems. Consequently, the amount of secondary air supplied to each of the exhaust systems tends to be insufficient, so that it becomes difficult to attain the expected exhaust gas cleaning effect.

SUMMARY OF THE INVENTION

It is, therefore, a primary object of the present invention to provide an exhaust gas cleaning device of an internal combustion engine wherein secondary-air supply pipes are communicated with exhaust passages, independent of each other, communicated with a cylinder respectively and further communicated with reed valves respectively without being concentrated, thereby to prevent the cancellation between the exhaust gas pulsation pressures produced in the exhaust systems different in length from each other respectively.

Another object of the present invention is to provide an exhaust gas cleaning device of an internal combustion engine capable of improving the efficiency of cleaning the exhaust gas flowing through an exhaust passage by improving a secondary-air supply system, particularly a reed valve provided in an intermediate part thereof, so that a desired amount of secondary air is constantly and smoothly supplied into the exhaust passage.

Still another object of the present invention is to provide an exhaust gas cleaning device of an internal combustion engine having a simple whole arrangement and enabling the number of the needed parts to be decreased as well as the cost to be largely reduced and moreover the device to be more lightweight as well as compact.

DESCRIPTION OF THE PREFERRED EMBODIMENT

A preferred embodiment of the present invention will be described hereinunder with reference to the accompanying drawings.

Figure 1:
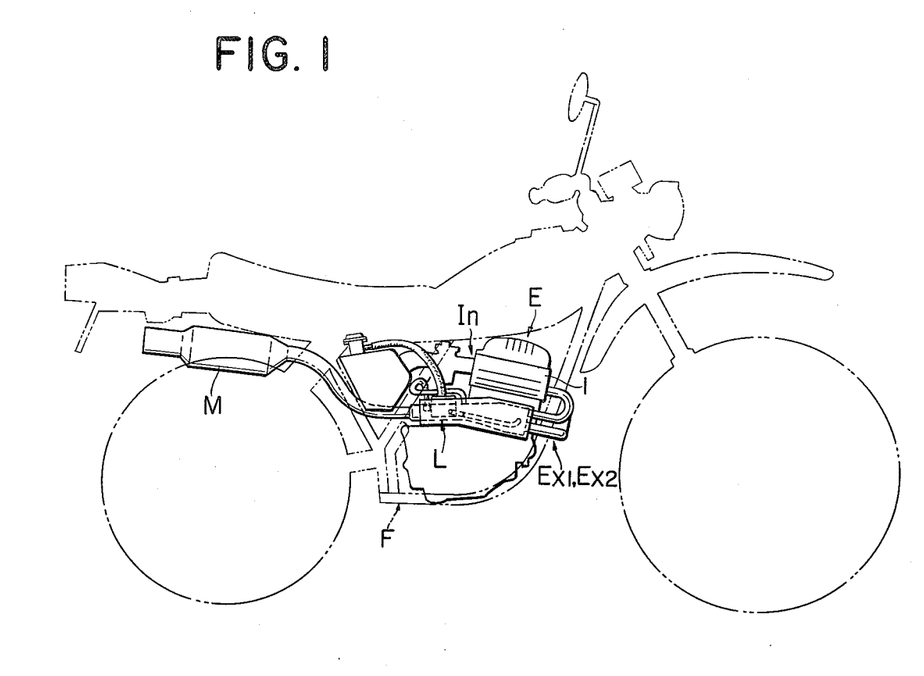
FIG. 1 is a side elevational view of a motorcycle mounted with an internal combustion engine equipped with an exhaust gas cleaning device according to the present invention.
Figure 2:
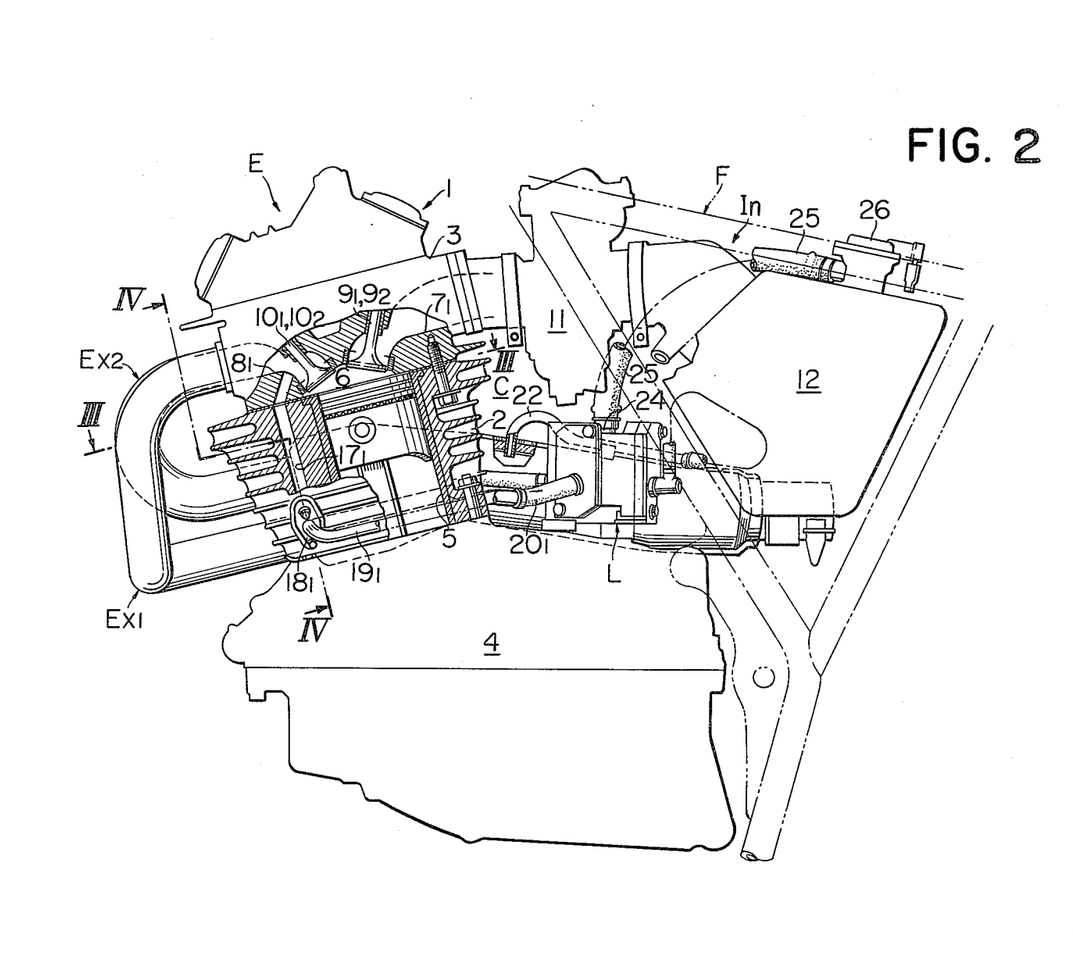
FIG. 2 is a sectional side elevational view of the head part of the same internal combustion engine.
Figures 3, 4:
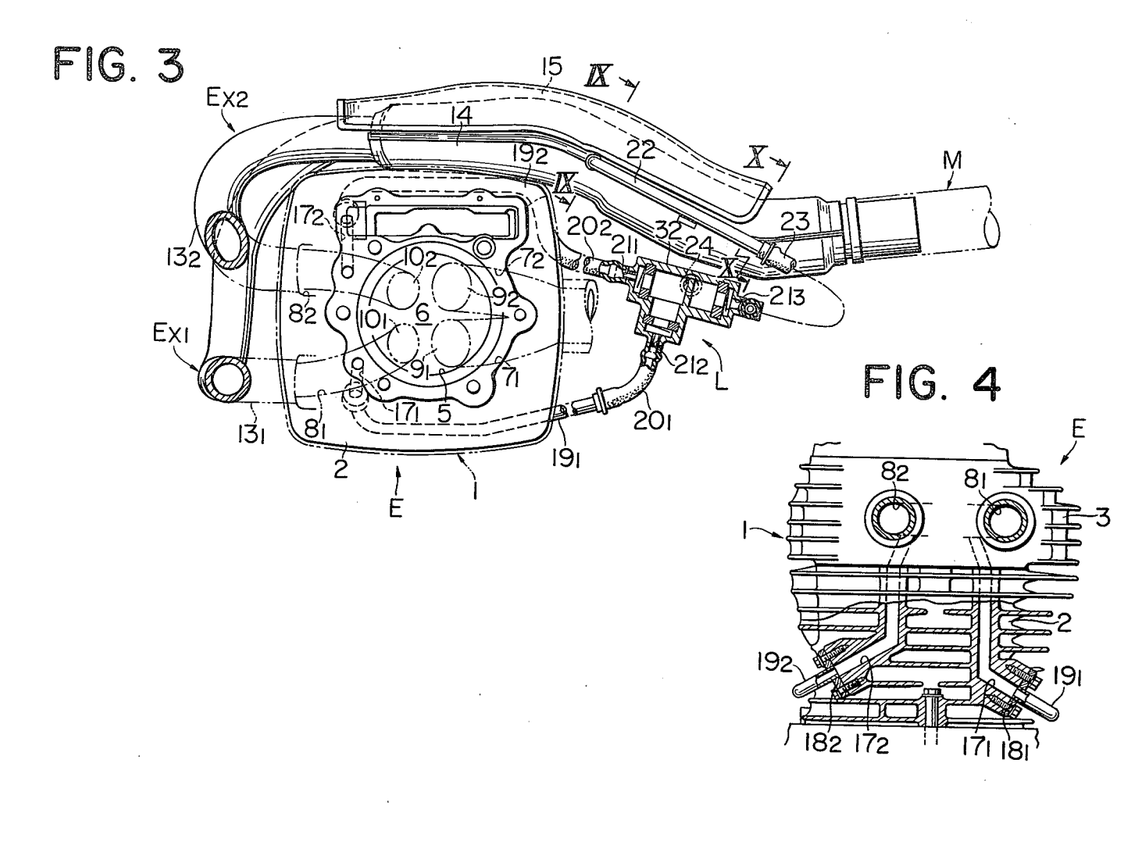
FIG. 3 is a sectional view of the head part of the internal combustion engine taken along the line III—III of FIG. 2.
FIG. 4 is a sectional view of the head part of the internal combustion engine taken along the line IV—IV of FIG. 2.

A four-stroke internal combustion engine E with four valves per cylinder is mounted on a frame F of a motorcycle. An engine main body 1 of the engine E comprises a cylinder block 2, a cylinder head 3 and a crankcase 4, the latter two being integrally connected to the upper and lower parts of the cylinder block 2 respectively. Two intake ports $7_1$, $7_2$ and two exhaust ports $8_1$, $8_2$ are opened to a combustion chamber 6 above a cylinder 5 of the engine main body 1 and adapted to be opened or closed by means of intake valves $9_1$, $9_2$ and exhaust valves $10_1$, $10_2$ respectively. As clearly shown in FIG. 2, the two intake ports $7_1$, $7_2$ are concentrated and opened to the rear surface of the cylinder head 3. Connected to the opening is an intake system In, comprising a carburetor 11 and an air cleaner 12, extending rearward of the frame F. On the other hand, the two exhaust ports $8_1$, $8_2$ are opened to the front surface of the cylinder head 3 in parallel with each other, without being concentrated, and connected with front exhaust pipes $13_1$, $13_2$ respectively. A single rear exhaust pipe 14 is integrally connected to the rear ends of the front exhaust pipes $13_1$, $13_2$. The two front exhaust pipes $13_1$, $13_2$ are bent along from the front part to a side part of the engine main body 1, and the front open ends thereof are connected with the exhaust ports $8_1$, $8_2$ of the engine main body 1, while the rear open ends thereof are concentrated and welded to the rear exhaust pipe 14. The rear exhaust pipe 14 is surrounded with an insulating material so that the exhaust gas flowing therethrough is kept warm. An exhaust muffler M is connected to the rear end of the rear exhaust pipe 14, and a catalyst converter is incorporated in the exhaust muffler M if necessary. Moreover, the rear exhaust pipe 14 is provided with a protector 15 covering the half of the outside thereof. Thus, the exhaust system of the internal combustion engine E comprises the exhaust ports $8_1$, $8_2$, the front exhaust pipes $13_1$, $13_2$, the rear exhaust pipe 14 and the exhaust muffler M.

Figure 9:
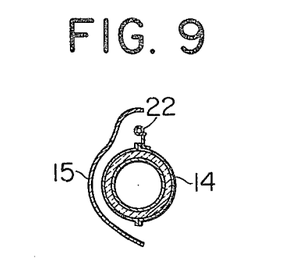
FIG. 9 is a sectional view of a portion of the head part of the internal combustion engine taken along the line IX—IX of FIG. 3.
Figure 10:
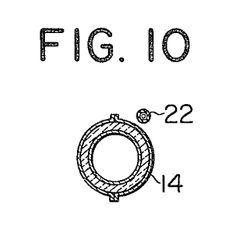
FIG. 10 is a sectional view of a portion of the head part of the internal combustion engine taken along the line X—X of FIG. 3.

Secondary-air passages $17_1$, $17_2$ formed extending over the cylinder block 2 and the cylinder head 3 of the engine main body 1 are communicated with portions near the exhaust valves $10_1$, $10_2$ of the two exhaust ports $8_1$, $8_2$ formed in the cylinder head 3 of the engine main body 1 respectively. These passages $17_1$, $17_2$ are opened to the outer surface of the cylinder block 2, and the open ends thereof are connected with secondary-air supply pipes $19_1$, $19_2$ through joints $18_1$, $18_2$ respectively. Taking a long way around the left and right sides of the cylinder block 2 and extending rearward thereof, the two secondary-air supply pipes $19_1$, $19_2$ are connected to outlet ports $21_1$, $21_2$ of a reed valve unit L, described later, through flexible hoses $20_1$, $20_2$. In addition, another secondary-air supply pipe 22 is provided directly above the rear exhaust pipe 14 and communicated therewith. The secondary-air supply pipe 22 is extended rearwardly along the rear exhaust pipe 14 and connected to another outlet port $21_3$ of the reed valve L through a flexible hose 23. As shown in FIG. 9 and FIG. 10, the secondary-air supply pipe 22 is located inner than the vertical center line of the rear exhaust pipe 14 in the part not covered with the protector 15.

The above-mentioned intake system In, i.e., the carburetor 11 and the air cleaner 12, extend rearwardly on the crankcase 4, so that a space C surrounded by the cylinder block 2, the crankcase 4 and the intake system In is formed in the rear of the engine main body 1. In the space C, the reed valve L of a secondary-air supply system, described later in greater detail, is disposed and mounted on the crankcase 4. According to such an arrangement as described above, it becomes possible to communicate the three secondary-air supply passages $19_1$, $19_2$ and $19_3$, connected to the outlet ports $21_1$, $21_2$ and $21_3$ of the reed valve L, with the secondary-air passages $17_1$, $17_2$ formed in the engine main body 1 with lengths substantially equal to each other and the rear exhaust pipe 14 respectively.

The reed valve L is provided in an intermediate part of the secondary-air supply system for supplying the secondary air for cleaning exhaust gas to the above-mentioned exhaust system Ex.

Figure 8:
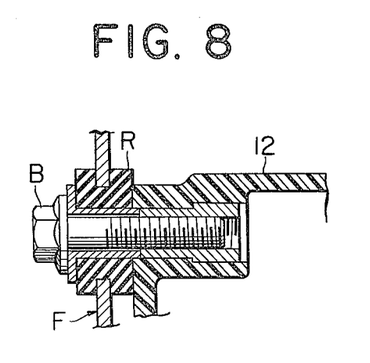
FIG. 8 is an enlarged sectional view of a portion of the head part of the internal combustion engine taken along the line VIII—VIII of FIG. 7.

An inlet port 24 of the reed valve L is communicated with one end of a secondary-air supply main pipe 25, which is communicated with the air-cleaning chamber in the air cleaner 12 through an air control valve 26. The air control valve 26, which is of a conventional known type, is controlled so as to be closed when it is unnecessary to introduce secondary air into exhaust passages $Ex_1$, $Ex_2$, e.g., when the engine E is decelerated, thereby to prevent after-burning. The air control valve 26 is directly attached to the air cleaner 12. Since the air cleaner 12 is supported by the frame F by means of a plurality of mounting bolts B, B . . . in a shock-absorbing manner through a rubber member R as clearly shown in FIG. 8, it becomes unnecessary to provide any mounting stay for the air control valve 26, which is directly supported by the air cleaner 12. Moreover, since the air cleaner 12 is mounted through the rubber member R, the need for any vibration-resisting parts is also eliminated, so that it becomes possible to simplify the mounting structure of the air control valve 26.

Figure 5:
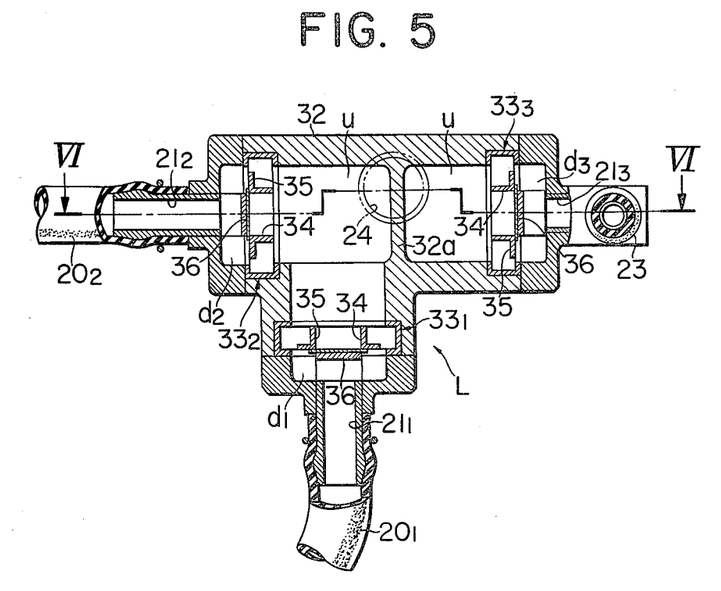
FIG. 5 is an enlarged sectional side elevational view of a reed valve pertaining to the exhaust gas cleaning device according to the present invention.
Figure 6:
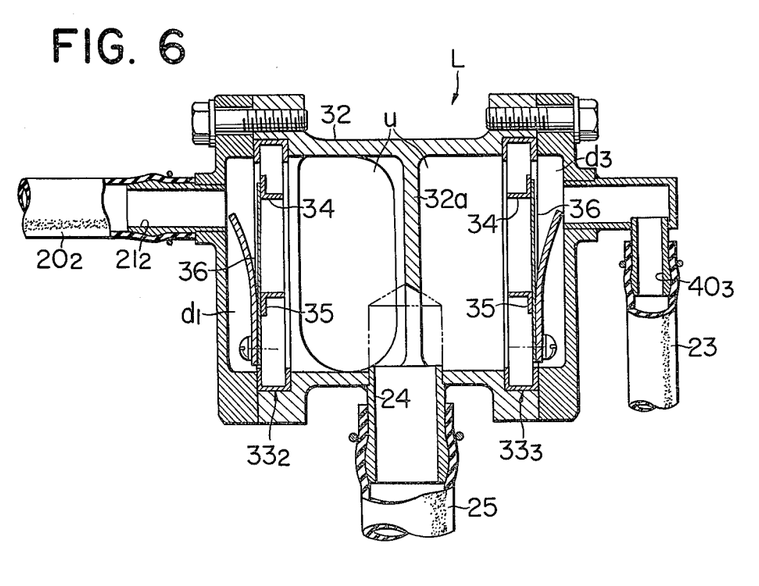
FIG. 6 is a sectional view of the reed valve taken along the line VI—VI of FIG. 5.
Figure 7:
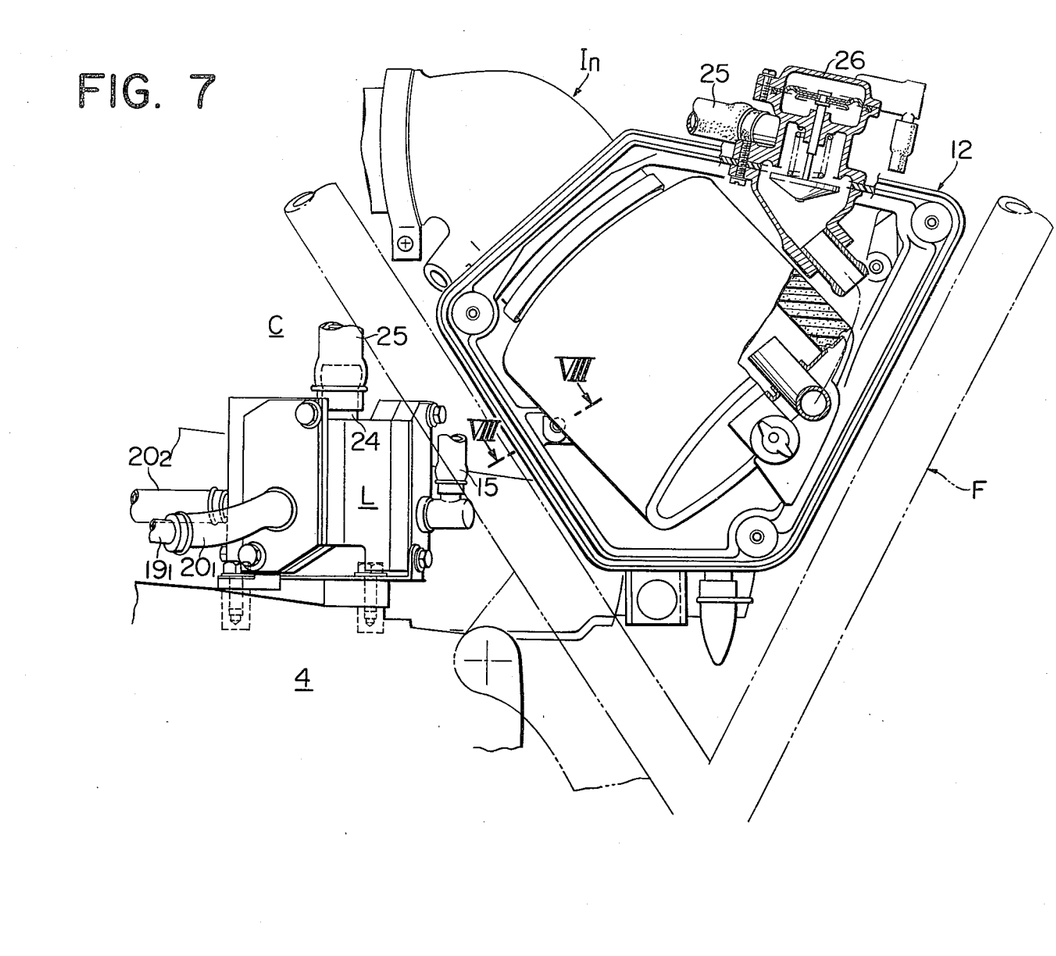
FIG. 7 is a partly-sectioned enlarged view of a portion of the head part of the internal combustion engine shown in FIG. 2.

The arrangement of the reed valve L will be described hereinunder with reference to mainly FIG. 5 and FIG. 6. A valve case 32 of the reed valve L is mounted on the crankcase 4 of the engine main body 1 within the space C surrounded by the cylinder block 2 of the engine main body 1, the exhaust system Ex and the air cleaner 12. The valve case 32 with a substantial T-shaped section has upstream chambers u formed in the central portion thereof as well as three downstream chambers $d_1$, $d_2$ and $d_3$ formed at end parts thereof radially within substantially the same plane with respect to the upstream chambers u. The upstream chambers u and the downstream chambers $d_1$, $d_2$ and $d_3$ are separated from each other respectively by means of reed valve bodies $33_1$, $33_2$ and $33_3$ attached to the valve case 32 respectively. Each of the reed valve bodies $33_1$, $33_2$ and $33_3$ is formed by mounting a reed 36 for opening or closing a valve port 34 on a valve seat body 35 having the valve port 34. The above-mentioned inlet port 24 is opened to the upstream chambers u while communicating with the secondary-air supply main pipe 25 opened to the atmospheric air through the air cleaner 12 as described above, and the air control valve 26 is provided in the intermediate part of the main pipe 25. Moreover, the outlet ports $21_1$, $21_2$ and $21_3$ are opened to the three downstream chambers $d_1$, $d_2$ and $d_3$ respectively, and two of the outlet ports, $21_1$, $21_2$, are communicated with one ends of the secondary-air supply pipes $19_1$, $19_2$ respectively. The secondary-air supply pipes $19_1 19_2$ extend forward toward the engine main body 1, and the other ends thereof are connected to the side surfaces of the cylinder block 2 and communicated with the secondary-air passages $17_1$, $17_2$ formed in the engine main body 1. The secondary-air passages $17_1$, $17_2$ are bored extending over from the cylinder block 2 to the cylinder head 3, and the upper ends thereof are opened to the portions near the exhaust valves of the exhaust ports $8_1$, $8_2$. On the other hand, the other outlet port $21_3$ is connected with one end of the other secondary-air supply pipe 22, which extends forward along the rear exhaust pipe 14, and the other end thereof is opened into the rear exhaust pipe 14.

In the valve case 32, the two downstream chambers $d_1$, $d_2$ communicating with the exhaust ports $8_1$, $8_2$ respectively are opposed to the other downstream chamber $d_3$ communicating with the rear exhaust pipe 14, and the upstream chambers u corresponding to these downstream chambers are separated from each other by means of a partition wall 32a integral with the valve case 32. The inlet port 24 is opened astride the partition wall 32a so that the atmospheric air from the inlet port 24 is substantially equally distributed between the right and left sides of the partition wall 32a separating the upstream chambers u from each other.

The operation of the preferred embodiment of the present invention will be described hereinunder.

When exhaust gas pulsation pressures are produced in the exhaust ports $8_1$, $8_2$ and the rear exhaust pipe 14 of the exhaust system Ex in accordance with the operation of the engine E, these pressures are applied to the downstream chambers $d_1$, $d_2$ and $d_3$ of the reed valve L through the three secondary-air supply pipes $19_1$, $19_2$ and 22, causing the reed 36 of each of the reed valve bodies $33_1$, $33_2$ and $33_3$ to be intermittently opened. Consequently, the clean air in the air cleaner 12 flows into the upstream chambers u of the reed valve L through the secondary-air supply main pipe 25 and further flows into the downstream chambers $d_1$, $d_2$ and $d_3$ through the opened reed valve bodies $33_1$, $33_2$ and $33_3$ before being introduced therefrom into the exhaust ports $8_1$, $8_2$ and the rear exhaust pipe 14, thereby to remove the unburnt components in the exhaust system Ex.

By the way, since the two exhaust ports $8_1$, $8_2$ are communicated with the secondary-air supply pipes $19_1$, $19_2$ respectively, which are communicated with the reed valve bodies $33_1$, $33_2$ independent of each other, respectively, if the front exhaust pipes $13_1$, $13_2$ are different in length from each other and consequently there is any difference between the frequencies of the exhaust gas pulsations generated in the exhaust ports $8_1$, $8_2$ respectively, these exhaust gas pulsations never cancel out each other. Accordingly, strong exhaust gas pulsations are applied to the secondary-air supply pipes $19_1$, $19_2$ respectively, so that the reed valve bodies $33_1$, $33_2$ are reliably opened to supply a desired amount of secondary air to each of the exhaust ports $8_1$, $8_2$.

Moreover, since the reed valve L has the upstream chambers u formed in the central portion of the valve case 12 as well as the three downstream chambers $d_1$, $d_2$ and $d_3$ radially formed within substantially the same plane with respect to the upstream chambers u, although the three downstream chambers $d_1$, $d_2$ and $d_3$ are formed in the valve case 32, it is possible to allow the secondary air in the upstream chambers u to smoothly flow into the downstream chambers $d_1$, $d_2$ and $d_3$ while taking the shortest courses with smaller resistances respectively. In addition, since the partition wall 32a is provided between the upstream chambers u corresponding to the downstream chambers $d_1$, $d_2$ communicating with the exhaust ports $8_1$, $8_2$ respectively and the downstream chamber $d_3$ communicating with the rear exhaust pipe 14 respectively, if there is any difference between the cycles of the exhaust gas pulsations in the exhaust ports $8_1$, $8_2$ and the rear exhaust pipe 14 respectively, the exhaust gas pulsations are never attenuated in a single upstream chamber u. Accordingly, a sufficient amount of secondary air is supplied to each of the exhaust ports $8_1$, $8_2$ and the rear exhaust pipe 14.

As will be fully understood from the foregoing description, according to the present invention, the following advantageous effects can be obtained.

In the internal combustion engine wherein a plurality of exhaust gas are communicated with a combustion chamber above a cylinder while exhaust pipes independent of each other are communicated with these exhaust ports respectively and a plurality of exhaust passages each comprising an exhaust port and an exhaust pipe are different in length from each other, the secondary-air supply pipes are communicated with the exhaust passages respectively and the exhaust gas pressure respondent valves, such as the reed valves, independent of each other are connected to these supply pipes. Accordingly, the exhaust gas pulsations generated in the exhaust passages different in length from each other never cancel out each other even if their frequencies differ from each other, and strong exhaust gas pulsation pressures are applied into the exhaust systems respectively, causing the reed valves independent of each other to be reliably opened, so that a desired amount of secondary air can be introduced into each of the exhaust systems, thereby realizing a large improvement in efficiency of cleaning exhaust gas by means of the secondary air.

Moreover, since the valve case provided in the intermediate part of the secondary-air supply system communicated with the exhaust system has the upstream chambers formed in the central portion thereof as well as the downstream chambers radially disposed within substantially the same plane with respect to the upstream chambers, and since the reed valve bodies allowing air to flow only from the upstream chambers to the downstream chambers are provided between the upstream chambers and the downstream chambers respectively and the inlet port opened to the atmospheric air is opened to the upstream chambers while the outlet ports communicating with the exhaust system are opened to the downstream chambers respectively, it is possible to supply secondary air to a plurality of portions in the exhaust system by means of a single reed valve through the shortest courses with smaller resistances. Accordingly, a desired amount of secondary air can be supplied to each of these portions thereby to permit improvement in efficency of cleaning the exhaust gas flowing through the exhaust system. In addition, the arrangement of the whole cleaning device can be simplified, so that it is possible to decrease the number of the parts needed and consequently largely reduce the cost as well as make the device more lightweight and compact.

Furthermore, since the outlet ports of the downstream chambers are communicated with such different portions as the exhaust ports of the exhaust system and the exhaust pipe respectively, and since the inside of the upstream chamber is partitioned by means of the partition wall so as to correspond to the downstream chambers communicated with the different portions respectively, the partitioned upstream chambers being communicated with the atmospheric air through the common inlet port, the exhaust gas pulsations different in cycle and acting upon these downstream chambers never interfere with each other in the upstream chambers. Accordingly, it is possible to reduce the attenuation of the exhaust gas pulsation pressures as much as possible, so that secondary air can be more smoothly introduced into each of the downstream chambers.

Furthermore, since the engine main body of the engine has the cylinder block extended in the vertical direction of the frame as well as the crankcase extended rearward of the frame, the crankcase being connected with the lower part of the cylinder block, and moreover the intake system connecting with the intake ports of the engine main body is extended rearward of the frame on the crankcase, and since the exhaust gas pressure respondent valve is disposed within the space surrounded by the cylinder block, the crankcase and the intake system, the exhaust gas pressure respondent valve is protected by the cylinder block, the crankcase and the intake system, which are strong in structure, so as to be prevented from interference with other parts, so that reliability and durability can be improved. In addition, the disposition of the exhaust gas pressure respondent valve has no effect on the layout as well as mounting of other devices.

Furthermore, such a disposition of the exhaust gas pressure respondent valve as described above facilitates connection of the secondary-air supply pipes between the valve and the different portions, such as the exhaust ports and the exhaust pipe of the exhaust system. Also, the lengths of the secondary-air supply pipes can be made substantially equal to each other, so that proper amounts of secondary air can be substantially equally distributed among a plurality of different portions of the exhaust system. Accordingly, it becomes possible to efficiently supply secondary air to the exhaust system.

Furthermore, in the motorcycle wherein the exhaust pipe communicating with the exhaust ports of the engine main body is disposed above the crankcase of the engine main body and in the longitudinal direction of the frame, since the secondary-air supply pipe for supplying secondary air to the exhaust pipe is disposed inner than the outside surface of the exhaust pipe, the secondary-air supply pipe is protected by the exhaust pipe, so that there is no possibility of any effect of external disturbance and moreover the external appearance is improved.

What is claimed is:

1. In an internal combustion engine having a plurality of exhaust systems which are made different in length from each other and comprise a plurality of exhaust ports formed in an engine main body and separately communicated with a combustion chamber above a single cylinder and exhaust pipes communicated with said plural exhaust ports respectively, an exhaust gas cleaning device wherein secondary-air supply pipes are communicated with said plural exhaust systems respectively and further connected with reed valve means adapted to open and close in response to the pulsation pressures of the exhaust gas in said plurality of exhaust systems communicated with said secondary-air supply pipes.

2. An exhaust gas cleaning device of an internal combustion engine as defined in claim 1, wherein said plurality of exhaust systems are arranged in a concentrated manner and further communicated with a secondary-air supply pipe, which is also connected with said reed valve means.

3. An exhaust gas cleaning device of an internal combustion engine as defined in claim 1, wherein said reed valve means comprises: a valve case; an upstream chamber formed in the central portion of said valve case; a plurality of downstream chambers formed in said valve case and radially disposed within substantially the same plane with respect to said upstream chamber; reed valve bodies formed between said upstream chamber and said downstream chambers respectively and adapted to allow air to flow only from said upstream chamber to said downstream chambers; an inlet port opened to said upstream chamber, said inlet port opening to the atmospheric air; and outlet ports opened to said downstream chambers respectively, and communicated with said plurality of exhaust systems respectively.

4. An exhaust gas cleaning device of an internal combustion engine as defined in claim 1, wherein said internal combustion engine is mounted on a frame of a motorcycle, said main body of said internal combustion engine has a cylinder block extended in the vertical direction of said frame as well as a crankcase extended rearward of said frame, said crankcase connecting with the lower part of said cylinder block, and moreover, an intake system leading to an intake port of said engine main body is extended rearward of said frame on said crankcase in order to dispose said reed valve means within the space surrounded by said cylinder block, said crankcase and said intake system.

5. An exhaust gas cleaning device of an internal combustion engine as defined in claim 4, wherein said secondary-air supply pipes communicating with said plurality of exhaust systems are disposed inwardly of and closer to said frame than the respective outside surfaces of said plurality of exhaust systems.

6. In an internal combustion engine having a plurality of exhaust ports formed in an engine main body and separately communicated with a combustion chamber above a single cylinder and a plurality of exhaust systems communicated with said plurality of exhaust ports respectively, said plurality of exhaust systems being made different in length from each other, an exhaust gas cleaning device wherein secondary-air supply pipes are communicated with said plural exhaust system respectively and further connected with reed valve means adapted to open and close in response to the pulsation pressures of the exhaust gas in said plurality of exhaust systems communicated with said secondary-air supply pipes, respectively, said reed valve means comprising: a valve case; an upstream chamber formed in the central portion of said valve case; a plurality of downstream chambers formed in said valve case and radially disposed within substantially the same plane with respect to said upstream chamber; reed valve bodies provided between said upstream chamber and said downstream chambers, respectively, and adapted to allow air to flow only from said upstream chamber to said downstream chambers; an inlet port opened to said upstream chamber, said inlet port opening to the atmospheric air; and outlet ports opened to said plurality of downstream chambers, respectively, and communicated with said respective exhaust systems, said outlet ports of said plural downstream chambers being communicated with different portions such as said exhaust ports and exhaust pipes of said exhaust systems, respectively, the inside of said upstream chamber being partitioned into a plurality of portions by a partition wall so as to correspond to said plurality of downstream chambers communicated with said different portions, respectively, said plurality of partitioned portions of said upstream chamber being communicated with the atmospheric air through said common inlet port.

* * * * *